(12) United States Patent
Ahman et al.

(10) Patent No.: US 7,387,662 B2
(45) Date of Patent: Jun. 17, 2008

(54) METHOD AND DEVICE FOR SEPARATING GASEOUS POLLUTANTS FROM HOT PROCESS GASES BY ABSORPTION AND A MIXER FOR MOISTENING PARTICULATE DUST

(75) Inventors: Stefan Ahman, Vaxjo (SE); Nils Bringfors, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 509 days.

(21) Appl. No.: 10/527,877

(22) PCT Filed: Sep. 17, 2003

(86) PCT No.: PCT/SE03/01453

§ 371 (c)(1),
(2), (4) Date: Mar. 16, 2005

(87) PCT Pub. No.: WO2004/026443

PCT Pub. Date: Apr. 1, 2004

(65) Prior Publication Data

US 2005/0244317 A1 Nov. 3, 2005

(30) Foreign Application Priority Data

Sep. 20, 2002 (SE) .................................... 0202789

(51) Int. Cl.
*B01D 53/50* (2006.01)
*B01D 53/83* (2006.01)

(52) U.S. Cl. .............................. 95/108; 95/137; 96/143; 110/216

(58) Field of Classification Search ..................... 95/57, 95/108, 109, 114, 137, 134, 148; 96/15, 96/143, 150; 110/203, 216; 423/210, 244.07
See application file for complete search history.

(56) References Cited

U.S. PATENT DOCUMENTS 3,485,014 A * 12/1969 Nishimoto et al. ........... 95/110

(Continued)

FOREIGN PATENT DOCUMENTS

EP 0 882 490 12/1998

(Continued)

OTHER PUBLICATIONS

PCT International Search Report dated Oct. 12, 2003 (PCT/SE2003/001453).

*Primary Examiner*—Frank M Lawrence
(74) *Attorney, Agent, or Firm*—Timothy J. Olson

(57) ABSTRACT

In a method of separating gaseous pollutants from hot process gases, the process gases are passed through a contact reactor (22), in which an absorbent material in a moistened state is introduced to convert the gaseous pollutants into separable dust. The dust is separated in a dust separator (10). The separated dust is cooled in a first step by being brought into direct contact with a cooling fluid. In a second step, the cooled dust is mixed with a gas containing water vapour, said gas having a saturation temperature that is higher than the temperature of the cooled dust. The dust moistened by condensation of the water vapour is introduced into the contact reactor (22) to be mixed with the process gases. A mixer (24) for moistening of absorbent material has a first end (26) and a second end (28) and is divided into two zones. A first zone is a cooling zone (68) located at the first end (26). A second zone is a moistening zone (80) located at the second end (28).

17 Claims, 3 Drawing Sheets

U.S. PATENT DOCUMENTS

| | | | |
|---|---|---|---|
| 4,548,797 A * | 10/1985 | Sauer et al. | 423/240 R |
| 4,795,619 A | 1/1989 | Lerner | |
| 5,246,680 A * | 9/1993 | Esa | 423/244.07 |
| 5,601,791 A * | 2/1997 | Plaks et al. | 422/169 |
| 5,795,548 A * | 8/1998 | Madden et al. | 422/171 |
| 6,290,921 B1 | 9/2001 | Kuivalainen et al. | |
| 6,302,945 B1 * | 10/2001 | Altman et al. | 96/44 |
| 6,506,348 B1 * | 1/2003 | Ochi et al. | 422/169 |
| 6,508,994 B1 * | 1/2003 | Åhman et al. | 423/210 |
| 7,141,093 B2 * | 11/2006 | Charette | 95/107 |

FOREIGN PATENT DOCUMENTS

| | | |
|---|---|---|
| WO | WO 96/16722 | 6/1996 |
| WO | WO 96/16727 | 6/1996 |

* cited by examiner

METHOD AND DEVICE FOR SEPARATING GASEOUS POLLUTANTS FROM HOT PROCESS GASES BY ABSORPTION AND A MIXER FOR MOISTENING PARTICULATE DUST

FIELD OF THE INVENTION

The present invention relates to a method of separating gaseous pollutants, such as sulphur dioxide, from hot process gases, such as flue gases, in which method the process gases are passed through a contact reactor, in which a particulate absorbent material reactive with the gaseous pollutants is introduced in a moistened state into the process gases in order to convert the gaseous pollutants into separable dust, after which the process gases are passed through a dust separator, in which dust is separated from the process gases and from which the cleaned process gases are discharged.

The present invention also relates to a mixer for moistening particulate dust which can react with gaseous pollutants in a process gas, such as a flue gas, to form separable dust.

The present invention also relates to a device for separating gaseous pollutants, such as sulphur dioxide, from hot process gases, such as flue gases, said device having a contact reactor, through which the process gases are intended to be passed and which has means for introducing a particulate absorbent material in a moistened state, which is reactive with the gaseous pollutants, into the process gases for the purpose of converting the gaseous pollutants into separable dust, and a dust separator which is adapted to separate the dust from the process gases and discharge the cleaned process gases.

BACKGROUND ART

When separating gaseous pollutants from process gases, such as flue gases from a coal- or oil-fired fired power plant, a method is frequently used, in which a lime-containing absorbent material is introduced into the process gas to react with the gaseous pollutants. When the absorbent material reacts with the gaseous pollutants, the gaseous pollutants are converted chemically or physically into dust, which is then separated in a filter.

WO 96/16722 discloses a method, in which lime-containing dust is mixed with water in a mixer and then introduced into a contact reactor to react with gaseous pollutants in a flue gas. Then the dust is separated in a filter and recirculated to the mixer to be mixed once more with water and subsequently again be introduced into the contact reactor. Thus, the dust will be circulated through the mixer several times. In each circulation, a small amount of dust is removed from the filter, and a small amount of fresh lime-containing material, for instance burnt lime, CaO, or dust containing a certain amount of burnt lime, is supplied to the mixer.

It has now been found that the above method results in a low degree of utilisation of the burnt lime supplied, i.e. that also the dust removed from the filter contains some burnt lime, in certain types of absorbent material. This increases the consumption of burnt lime and implies that the dust removed from the filter will contain a great deal of burnt lime that has not reacted. The low degree of utilisation of the burnt lime increases the costs of operating the plant and makes the handling of removed dust difficult.

SUMMARY OF THE INVENTION

The object of the present invention therefore is to provide an efficient method of separating gaseous substances from process gases, such as flue gases, in which method the above drawbacks of prior-art technique are eliminated or significantly reduced.

This object is achieved by a method which is of the type stated by way of introduction and characterised in that a circulating part of the dust separated in the dust separator is cooled in a first step by being brought into direct contact with a cooling fluid, the cooled dust is mixed in a second step with a gas containing water vapour, said gas having a saturation temperature that is higher than the temperature of the cooled dust, and the dust moistened by condensation of the water vapour is introduced as absorbent material into the contact reactor to be mixed with the process gases.

A further object of the present invention is to provide a mixer for treating absorbent material intended for separation of gaseous substances from process gases, such as flue gases, said mixer eliminating or significantly reducing the above drawbacks of prior-art technique.

This object is achieved by a mixer which is of the type stated by way of introduction and characterised in that the mixer has a first end and a second end and is divided into two zones, of which a first zone is a cooling zone which is located at the first end and which is provided with a means for supplying a cooling fluid, and of which a second zone is a moistening zone which is located at the second end and which is provided with a means for supplying a gas containing water vapour, the mixer being adapted first to pass dust from an inlet for dust, located at the first end, through the cooling zone and, in the cooling zone, supply a cooling fluid having a lower temperature than the dust, and mix the dust with this fluid, then pass the dust through the moistening zone and, in the moistening zone, supply a gas containing water vapour and having a saturation temperature which is higher than the temperature of the cooled dust, and mix this gas with the cooled dust, and then introduce the moistened dust as absorbent material into the process gas through an outlet located at the second end.

It is also an object of the present invention to provide a device for separating gaseous pollutants from a process gas, such as a flue gas, which device eliminates or significantly reduces the above drawbacks of prior-art technique.

This object is achieved by a device which is of the type stated by way of introduction and characterised in that it has a cooling zone for cooling at least a circulating part of the dust separated in the dust separator, means for supplying a cooling fluid to the cooling zone for cooling the dust by direct contact between the fluid and the dust, means for feeding the cooled dust to a moistening zone, means for supplying a gas containing water vapour and having a saturation temperature which is higher than the temperature of the cooled dust, to the cooled dust in order to moisten this by condensation of water vapour, and means for feeding the moistened dust to the contact reactor.

Further advantages and features of the invention will be evident from the following description and the appended claims.

BRIEF DESCRIPTION OF THE DRAWINGS

The invention will now be described in more detail by way of a number of embodiments and with reference to the accompanying drawings.

DETAILED DESCRIPTION OF THE INVENTION

Figure 1:
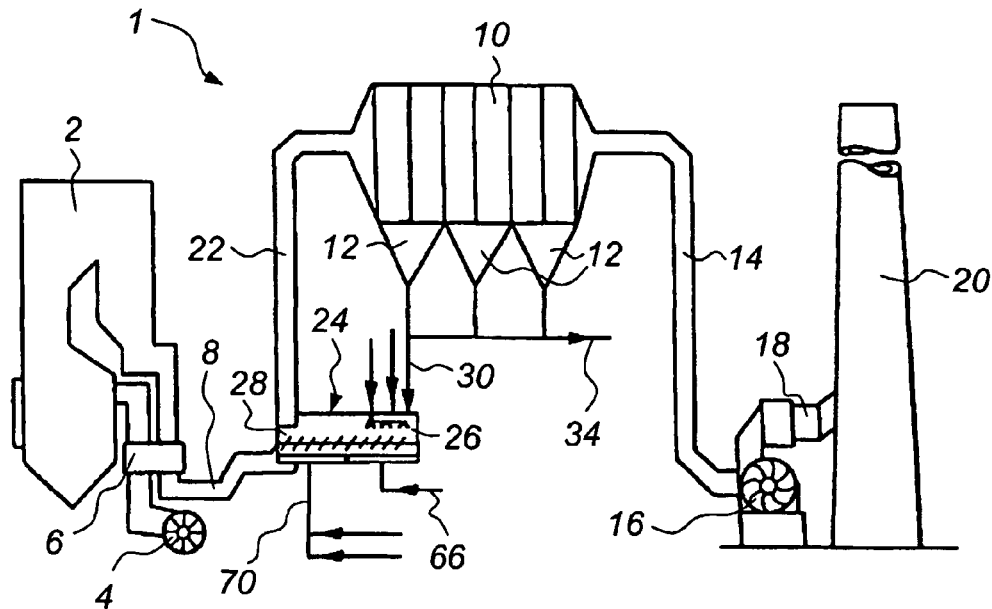
FIG. 1 is a schematic side view of a power plant which is provided with equipment for cleaning flue gases.

In the invention, dust is treated in order to be introduced into a process gas, such as a flue gas. The dust is of a type reacting with gaseous pollutants contained in the process gas and forms, with these, separable dust. The dust is separated and can then be circulated wholly or partly to be treated again and once more be introduced into the flue gas to react with further gaseous pollutants.

According to the invention, the dust is treated in two steps. In a first step, the dust is cooled by direct contact with a cooling medium to a suitable temperature. In a second step, a gas is supplied, which contains water vapour and has a saturation temperature which is higher than the temperature of the cooled dust. In the second step, water vapour will condense on the cooled particles in the dust. Thus, the particles in the dust that has passed the second step will be coated with a film of condensed water. This film of condensed water has been found to give surprising improvements of the treated dust's capability of reacting with and binding gaseous pollutants. A possible explanation of the dust's improved capability of reacting with gaseous substances can be that the condensed film is thin and even and is well suited to dissolve gaseous pollutants which can then participate in reactions with the dust. Another possible explanation of the improved reactivity of the dust is that the film of condensed water causes chemical reactions in the individual particle. The chemical reactions develop heat and break the particle so that its interior will be available for chemical reactions. One example is dust containing burnt lime, CaO, which according to this explanation can be activated, i.e. be made more available for chemical reactions, such as the slaking reaction that will be described below.

The direct cooling of the dust in said first step has several advantages. The cooling will be efficient by the contact surface between the cooling medium and the particles contained in the dust being great. The cooling fluid supplied to the dust can often be given additional tasks. Examples of such fluids are compressed air, which simultaneously with the cooling can be used to fluidise the dust, and water, which simultaneously with the cooling can be used to slake burnt lime, CaO, contained in the dust. By letting one of these fluids in direct contact with the dust cool the dust in said first step, very efficient cooling is thus achieved by simple means. Indirect cooling with heat exchangers or the like is unsuitable since the risk is great that a heat exchanger will be clogged in connection with the type of dust that is involved in cleaning of process gases.

In the invention, moistened dust is thus supplied to the process gases and is allowed to react with the process gases. In the reaction, gaseous pollutants are bound to the particles contained in the dust and thus converted into separable dust. This dust is separated in a dust separator and collected in a dust hopper. Some of the dust collected in the dust hopper is removed for landfilling or processing. The major part of the collected dust is supplied to a mixer where it is cooled and moistened to be introduced once more in the form of absorbent material into the process gases. The mixer is continuously supplied with a certain amount of fresh absorbent material to compensate for the absorbent material consumed in reaction with the gaseous pollutants. The fresh absorbent material suitably contains burnt lime, CaO. Burnt lime can be supplied in various forms. Examples of fresh absorbent materials are fresh burnt lime and fly ash from boiler injection. It is quite common to inject limestone, $CaO_3$, directly into a boiler, for instance an oil boiler, for the purpose of separating sulphur dioxide. This cleaning method, however, is inefficient and the fly ash separated in a dust separator arranged after the boiler contains particles having a surface of gypsum and a core of burnt lime, CaO. It has now surprisingly been found possible to reuse, by means of the present invention, fly ash from boiler injection as fresh absorbent material. A possible explanation of this is that the combination of direct cooling and condensation of vapour makes it possible to activate the burnt lime inside the particles. Thus, fresh absorbent material can be produced on the one hand by limestone being supplied to the boiler and forming burnt lime which is then collected in the dust separator and passed to the cooling zone and the moistening zone and, on the other hand, by collected fly ash from another power plant, which uses boiler injection of limestone, being supplied to the mixer. It has also been found possible to use fly ash originating from boilers that are fired with lime-containing fuels, as fresh absorbent material.

Furthermore it has been found possible to use in the invention fresh burnt lime of types that could previously not be used. Examples of such types of burnt lime are deadburnt lime and burnt lime which has been produced from limestone containing large amounts of magnesium as a pollutant.

The sum reaction when burnt lime, CaO, is used to convert gaseous sulphur dioxide, $SO_2$, into separable dust can be written as follows:

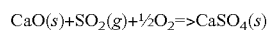

As is evident from that stated above, one mole of CaO is thus required to separate one mole of $SO_2$ under ideal conditions; this condition is called a stoichiometry=1.0. In practice, the number of moles of added CaO must often be considerably larger than the number of moles of $SO_2$ to achieve the desired separation of $SO_2$. A stoichiometry=2.0 means that the number of moles of CaO that is supplied is twice as great as the number of moles of $SO_2$ contained in the uncleaned gas. It has been found possible to separate, by means of the present invention, a certain amount of $SO_2$ with a considerably lower stoichiometry, i.e. a smaller addition of CaO, than has previously been possible in prior-art technique.

The fact that the treated absorbent material has increased reactivity with the gaseous pollutants has also the advantage that the amount of dust that must be circulated through the mixer can be reduced without decreasing the separation of gaseous pollutants from the process gases. A mixer for use in the invention can therefore be made small and consumes less energy than in the case of prior-art technique.

It is particularly convenient to use water as a cooling fluid in the cooling zone. Water is cheap and can easily be cooled, if necessary, to a temperature which is lower than the temperature of the separated dust. If the fresh absorbent material contains burnt lime, water will slake the lime according to the slaking reaction

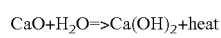

In the slaking reaction, heat is thus generated and water is consumed. The slaking of burnt lime in the cooling zone has several advantages. The slaked lime, $Ca(OH)_2$, is more reactive with regard to the gaseous pollutants than burnt lime, which means that the absorbent material's capability of binding these pollutants will be improved. A further advantage is that the supplied water in the cooling zone slakes the burnt lime which is easily available on the surface of the particles contained in the dust. When the dust reaches the moistening zone, the water that is condensed from the supplied vapour will not be consumed by the slaking reaction, nor will heat that can evaporate the thin water film develop to any great extent. As a result, the water condensed on the particles in the moistening zone can form an even and thin film which has good capability of dissolving gaseous pollutants. The even and thin film also seems to be able to penetrate into the particles through micro-cracks so as then to break the particles by a slaking reaction in the interior of the particles, so that their interior of burnt lime will be available for slaking when passing through the cooling zone during the next dust circulation cycle.

Compressed air is a further example of a cooling fluid that can be used in the cooling zone. Compressed air generated by a compressor often keeps a relatively high temperature, and it is therefore convenient to cool the compressed air to a low temperature. Cooling can take place, for instance, using an air- or water-cooled heat exchanger or directly by mixing with cold air or cold water. The cooled compressed air can be used, for instance, in the actual mixer as fluidising air or in the vessel collecting the dust separated in the dust separator.

A suitable mixer has a first end and a second end. The inlet for dust from the dust separator and the cooling zone are suitably located at the first end while the moistening zone and an outlet for moistened absorbent material to be introduced into the process gases are suitably located at the second end. It has been found appropriate that the dust be transported in an essentially horizontal direction from the cooling zone to the moistening zone. However, it is also possible to let the transport of dust through the mixer take place at a certain angle or vertically. It is very important for absorbent material that has been moistened in the moistening zone not to be recirculated to the cooling zone to any great extent. It is often suitable to provide the mixer with a mechanical stirrer. This stirrer should mix the dust with the cooling fluid and the gas containing vapour respectively, but not mix dust in the moistening zone with dust in the cooling zone.

The first step, i.e. the direct cooling of the dust, is suitably carried out during a period of 2-600 s, still more preferred 2-20 s. It has been found that residence times in the cooling zone of less than 2 s yield insufficient cooling of the particles in the dust. As a result, condensation of vapour in the subsequent moistening step will be inefficient. With residence times of more than 600 s, also the interior of the particles will be cooled, which causes the supplied cooling fluid to be used inefficiently. Moreover, longer residence times have the drawback that a larger mixer is required. The dust cooled in the cooling zone should be transferred to the moistening zone within 10 s. With longer periods, the hot interior of the particles will again heat the surface of the particles, which deteriorates the condensation of vapour in the moistening step.

The second step, i.e. moistening of the dust, is suitably carried out during a period of 2-30 s on average. It has been found that residence times in the moistening zone of less than 2 s yield uneven and insufficient condensation of water vapour on the particles in the dust. Residence times in the moistening zone of more than 30 s have the drawback that heat from the interior of the particle is conducted to the surface of the particle and may cause evaporation of the condensed, thin water film. A long residence time also requires a large mixer, which increases the investment costs and causes more fluidising air to be consumed. The moistened absorbent material should be introduced into the process gases within 5 s for the condensed, thin water film not to be evaporated when heat from the interior of the particle is conducted to its surface.

The gas containing water vapour and having a saturation temperature which is higher than the temperature of the cooled dust is suitably produced by compressed air and water vapour being mixed in suitable proportions. Use of water vapour only is also conceivable. Since the gas is often used to fluidise the dust during moistening, relatively large amounts of gas are required. For this reason, it is in many cases convenient to add a certain amount of compressed air and dilute the water vapour with this.

Conveniently the gas containing water vapour has a saturation temperature with regard to water vapour which is 5-30° C. higher than the temperature of the cooled dust. If the saturation temperature of the gas is less than 5° C. higher than the temperature of the dust, condensation will be slow because of a weak driving force. There is also a great risk that not the entire particle is coated with a thin film of condensed water. When the saturation temperature of the gas is more than 30° C. higher than the temperature of the cooled dust, there is a risk that condensation will be so quick that the dust will locally be wet and/or sticky in some parts of the mixer while the dust is still dry in other parts of the mixer.

According to an embodiment of the invention, a certain amount of water is supplied directly to the contact reactor where the moistened dust and the process gases, for instance the flue gases, are mixed. A particular advantage is then that, for instance, burnt lime, which has been activated in the moistening zone by particles being broken, directly in the contact reactor can be slaked to slaked lime by the added water so as then, almost immediately, to react with the gaseous pollutants. Thus, the moistened dust's capability of reacting with gaseous pollutants is further increased. The water supplied directly to the contact reactor can wholly or partly replace the water supplied to the dust in the cooling zone. For instance, it is possible to use in the cooling zone merely cooled compressed air, a combination of cooled compressed air and water, or merely water having a temperature which is lower than the temperature of the dust collected in the precipitator, in which case the whole, or parts, of the total amount of water that is required to slake the burnt lime and provide a suitable temperature and moisture content in the contact reactor, is supplied directly to the contact reactor.

DESCRIPTION OF PREFERRED EMBODIMENTS

FIG. 1 shows schematically a power plant 1. The power plant 1 has a coal-fired boiler 2 in which coal is burnt in air. Air is fed by means of a fan 4 through a preheater 6 into the boiler 2. Flue gases containing dust, such as fly ash, and gaseous pollutants, such as sulphur dioxide, are produced in burning. The hot flue gases are passed in a duct 8 through the preheater 6, in which the flue gases exchange heat with the combustion air coming from the fan 4, to a dust separator in the form of an electrostatic dust separator 10, also referred to as electrostatic precipitator. Dust is separated from the flue gas in the precipitator 10. The precipitator 10 has three dust hoppers 12 collecting the dust separated in the precipitator 10.

The cleaned flue gas leaves the precipitator 10 through a duct 14 and is fed by means of a fan 16 through a duct 18 to a chimney 20 to be emitted into the atmosphere.

The duct 8 has a vertical duct portion which constitutes a contact reactor 22. A mixer 24 communicates with the contact reactor 22 in the lower part thereof.

Figure 2:
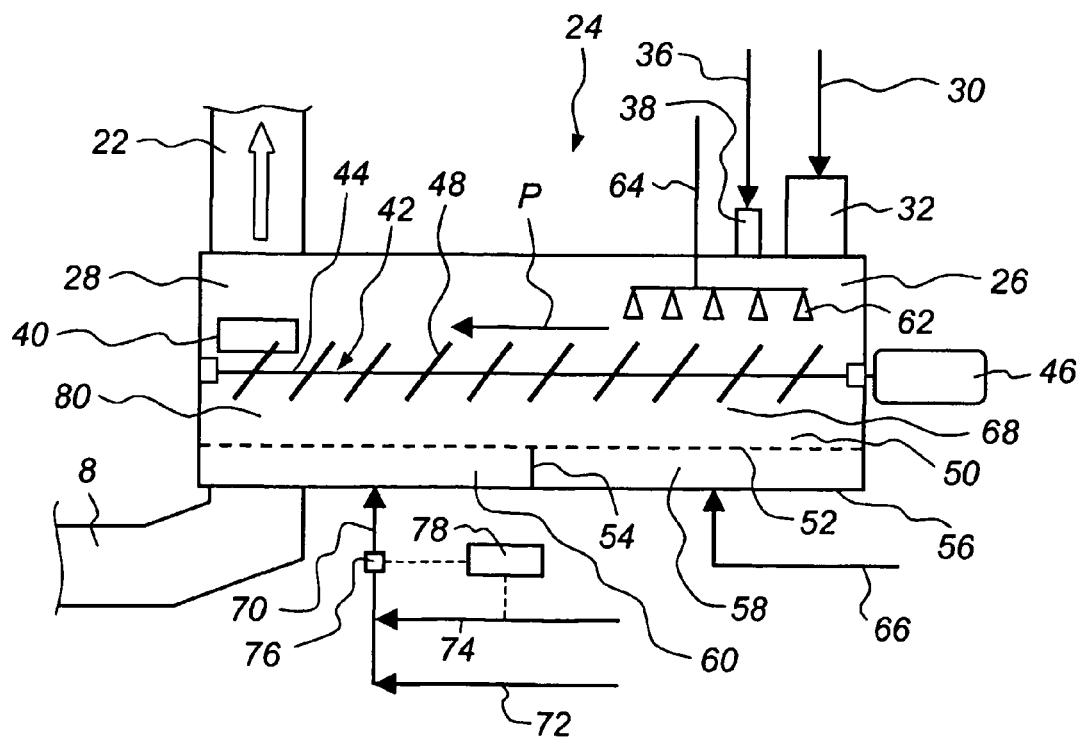
FIG. 2 is a schematic cross-sectional view of a mixer according to FIG. 1 in detail.

FIG. 2 illustrates the mixer 24 in more detail. The mixer 24 has a first end 26 and a second end 28. A circulating part of the dust collected in the dust hoppers 12 is fed through a duct 30 to an inlet 32 located at the first end 26 of the mixer 24. A small amount of the dust collected in the dust hoppers 12 is fed through a duct 34 shown in FIG. 1 for processing or landfilling. Fresh absorbent material in the form of burnt lime, CaO, is fed through a duct 36 into the mixer 24 through an absorbent inlet 38 located at the first end 26 of the mixer. At the second end 28, the mixer 24 has an outlet 40 formed as an overflow intended for moistened absorbent material and located on one long side. A corresponding outlet for moistened absorbent material is formed on the other long side which is not shown in FIG. 2. Part of the second end 28 of the mixer 24 is placed inside the contact reactor 22 in such a manner that moistened absorbent material leaving the mixer 24 through the outlet 40 will be entrained by the flue gas flowing upwards in the contact reactor 22.

The mixer 24 has a mechanical stirrer 42 which has a shaft 44 extending from the first end 26 to the second end 28 and journalled in bearings in the respective ends 26, 28. A motor 46 is arranged to rotate the shaft 44 and the inclined, elliptic discs 48 that are fixedly connected to the shaft.

A gas-permeable cloth 52 is fixed in the lower portion 50 of the mixer 24. A partition 54 extends from the bottom 56 of the mixer 24 to the cloth 52 and thus divides the space between the cloth 52 and the bottom 56 into a first chamber 58 and a second chamber 60. An array of nozzles 62 is arranged inside the mixer 24 above the first chamber 58. A water pipe 64 is arranged to supply water having a lower temperature than the dust that is supplied to the mixer 24 through the dust inlet 32, to the nozzles 62. An air line 66 is arranged to supply compressed air to the chamber 58. The space of the mixer 24 which at the first end 26 thereof is formed between the first chamber 58 and the nozzles 62 will constitute a cooling zone 68 where the dust supplied to the mixer 24 is mixed with the water supplied through the nozzles 62 and is cooled by the same.

A gas conduit 70 is arranged to supply pressurised gas to the second chamber 60. The gas conduit 70 is supplied with compressed air through an air line 72 and water vapour through a vapour line 74. A moisture content meter 76 is arranged to measure the moisture content of the mixture of pressurised vapour and compressed air. A control unit 78 is arranged to receive a signal from the moisture content meter 76 and, in response to this signal, control the supply of water vapour through the vapour line 74 in such a manner that the desired saturation temperature is obtained in the gas supplied to the second chamber 60 through the gas conduit 70. The saturation temperature of the gas supplied through the gas conduit 70 is controlled in such a manner that the saturation temperature at the pressure prevailing in the mixer 24 is higher than the temperature of the dust that has been cooled in the cooling zone 68.

When operating the mixer 24, dust from the precipitator 10 and fresh absorbent material will continuously be supplied to the mixer through the dust inlet 32 and the absorbent inlet 38 respectively. Since the cloth 52 is permeable to gas, the compressed air supplied through the line 66 will fluidise the supplied dust above the first chamber 58. The supply of dust through the dust inlet 32 at the first end 26 of the mixer 24 and the fluidisation will cause the dust to be transported, in FIG. 2 indicated by an arrow P, from the first end 26 of the mixer 24 in the direction of its second end 28 during mixing and cooling in the cooling zone 68. The gas supplied through the gas conduit 70 will fluidise the cooled dust above the second chamber 60. Since the saturation temperature of the gas supplied through the gas conduit 70 is higher than the temperature of the cooled dust, water vapour will condense on the dust. Thus at the second end 28 of the mixer 24 a moistening zone 80 located above the second chamber 60 will be provided, where the dust that has been cooled in the cooling zone 68 is moistened by water vapour supplied through the gas conduit 70 condensing on the surface of the particles contained in the dust. The moistened dust is transported through the mixer 24 in the direction of arrow P and leaves the mixer 24 through the outlet 40. Since the outlet 40 is in direct communication with the contact reactor 22, the moistened dust will be mixed with the flue gases and react with gaseous pollutants contained in the flue gases.

Figure 3:
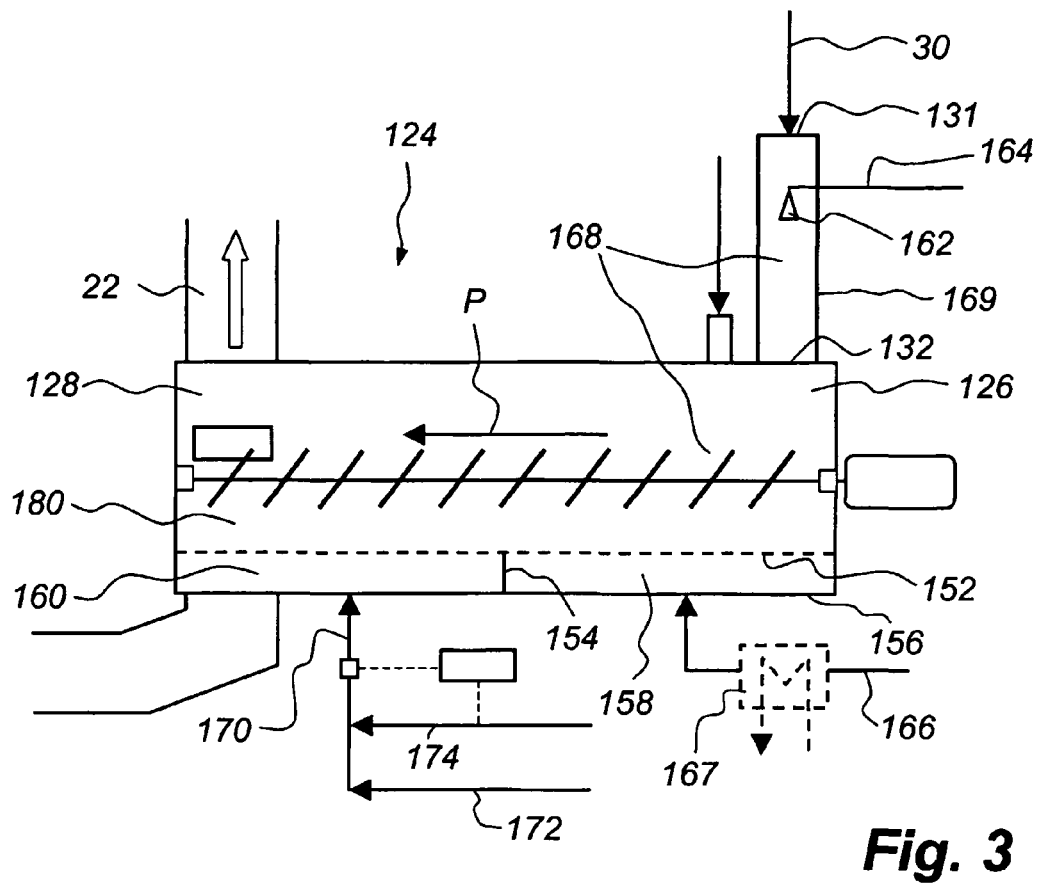
FIG. 3 is a schematic cross-sectional view of a mixer according to a second embodiment of the invention.

FIG. 3 shows a second embodiment of the present invention in the form of a mixer 124. The mixer 124 differs from the mixer 24 as described above mainly with regard to the design of the cooling zone. Thus the cooling zone 168 of the mixer 124 also comprises a spray reactor 169. The spray reactor 169 has a nozzle 162 and a water pipe 164 which is arranged to supply water to the nozzle 162. Dust from the dust hoppers 12 is supplied to the spray reactor 169 through an inlet 131 located at the upper end thereof. The spray reactor 169 is thus arranged to mix water, that has a lower temperature than the dust separated in the precipitator 10, with the circulating part of the dust and, consequently, cool the dust. In the lower part of the spray reactor 169 there is an outlet 132, through which the cooled dust is supplied to the mixer 124 at the first end 126 thereof. The mixer 124 has, like the mixer 24, a horizontal gas-permeable cloth 152 just above its bottom 156. A partition 154 divides the space between the cloth 152 and the bottom 156 into a first chamber 158 located at the first end 126 of the mixer 124, and a second chamber 160 located at the second end 128 of the mixer 124. A compressed air line 166 is arranged to supply compressed air to the first chamber 158 and to fluidise and mix the cooled dust coming from the spray reactor 169. The space of the mixer 124 which is located above the first chamber 158 will thus, together with the spray reactor 169, form a cooling zone 168. A gas conduit 170 is arranged to supply to the second chamber 160 a mixture of compressed air supplied from a compressed air line 172 and water vapour supplied through a vapour line 174 in a manner similar to that described above with regard to the mixer 24. The space of the mixer 124 which is located above the second chamber 160 will thus form a moistening zone 180. As indicated in FIG. 3, a heat exchanger 167 can be arranged on the compressed air line 166. The heat exchanger 167, which suitably uses cold water as cooling medium, can be used to cool the compressed air that is to be supplied to the first chamber 158 to a temperature that is lower than the temperature of the dust coming from the spray reactor 169. As a result, the thus cooled compressed air will provide additional cooling of the dust in the space of the mixer 124 located above the chamber 158.

Figure 4:
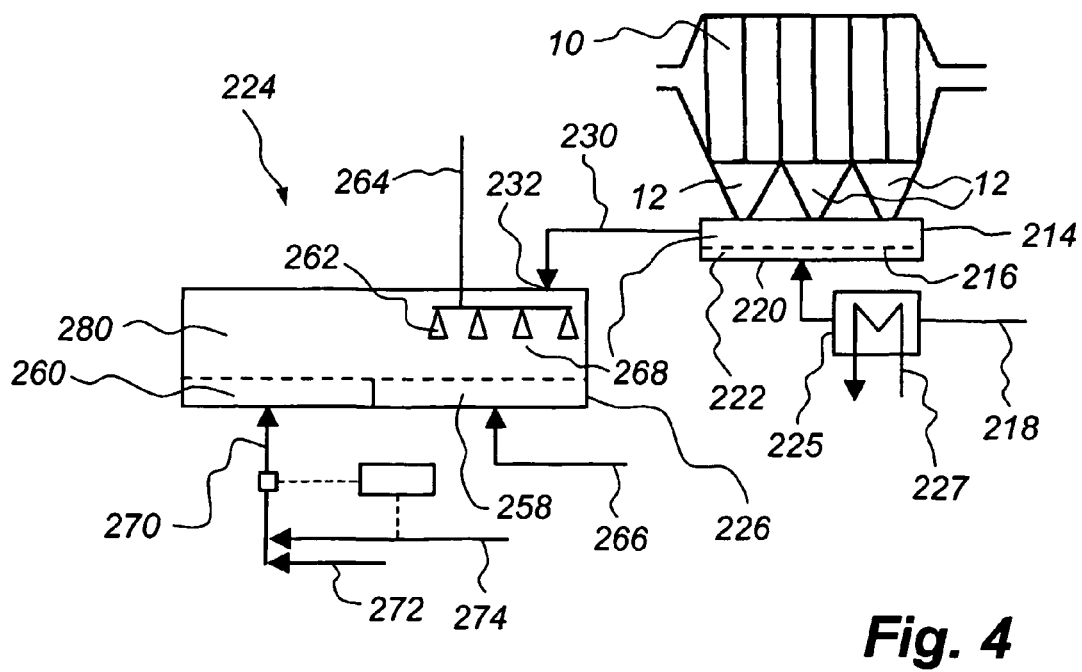
FIG. 4 is a schematic cross-sectional view of a third embodiment of the invention.

FIG. 4 shows a third embodiment of the invention in the form of a mixer 224. The mixer 224 is essentially identical with the mixer 24 shown in FIG. 2 and thus has a first chamber 258 and a second chamber 260. A compressed air line 266 is arranged to supply compressed air to the first chamber 258 for the purpose of fluidising dust. A gas conduit 270 is arranged to supply to the second chamber 260 a mixture of compressed air, which is supplied from a compressed air line 272, and water vapour, which is supplied through a vapour line 274, for the purpose of fluidising and moistening the dust in a manner similar to that described above with regard to the mixer 24 before the moistened dust is introduced as absorbent material into the contact reactor 22 (not shown in FIG. 4). A water pipe 264 is arranged to supply water to a number of nozzles 262 arranged above the first chamber 258. The dust hoppers 12 in the precipitator 10 open into a fluidised collecting vessel 214. The collecting vessel 214 has a gas-permeable cloth 216. A compressed air line 218 is arranged to supply compressed air to an air chamber 222 formed between the cloth 216 and the bottom 220 of the vessel 214, for the purpose of fluidising in the vessel 214 the dust that has been collected in the dust hoppers 12. The compressed air line 218 is provided with a heat exchanger 225. Water having a temperature that is lower than the temperature of the dust separated in the precipitator 10 is supplied to the heat exchanger 225 through a pipe 227. The heat exchanger 225 has such a heat transfer surface that compressed air supplied through the line 218 can be cooled to a temperature that is lower than the temperature of the dust separated in the precipitator 10. The cooled compressed air supplied to the vessel 214 will cool the dust during fluidisation. The dust cooled in the vessel 214 is then supplied through a dust line 230 and an inlet 232 located at the first end 226 of the mixer 224, to the mixer 224 so as then to be further cooled by the water supplied to the mixer 224 through the nozzles 262. A line (not shown) is arranged to remove a small amount of the dust collected in the vessel 214 for landfilling. The embodiment shown in FIG. 4 will thus have a cooling zone 268 which consists on the one hand of the collecting vessel 214 and, on the other hand, of the space of the mixer 224 which is located above the first chamber 258. The space of the mixer 224 located above the second chamber 260 will also in this embodiment form a moistening zone 280, which opens into an outlet, not shown in FIG. 4, for moistened dust.

Figure 5:
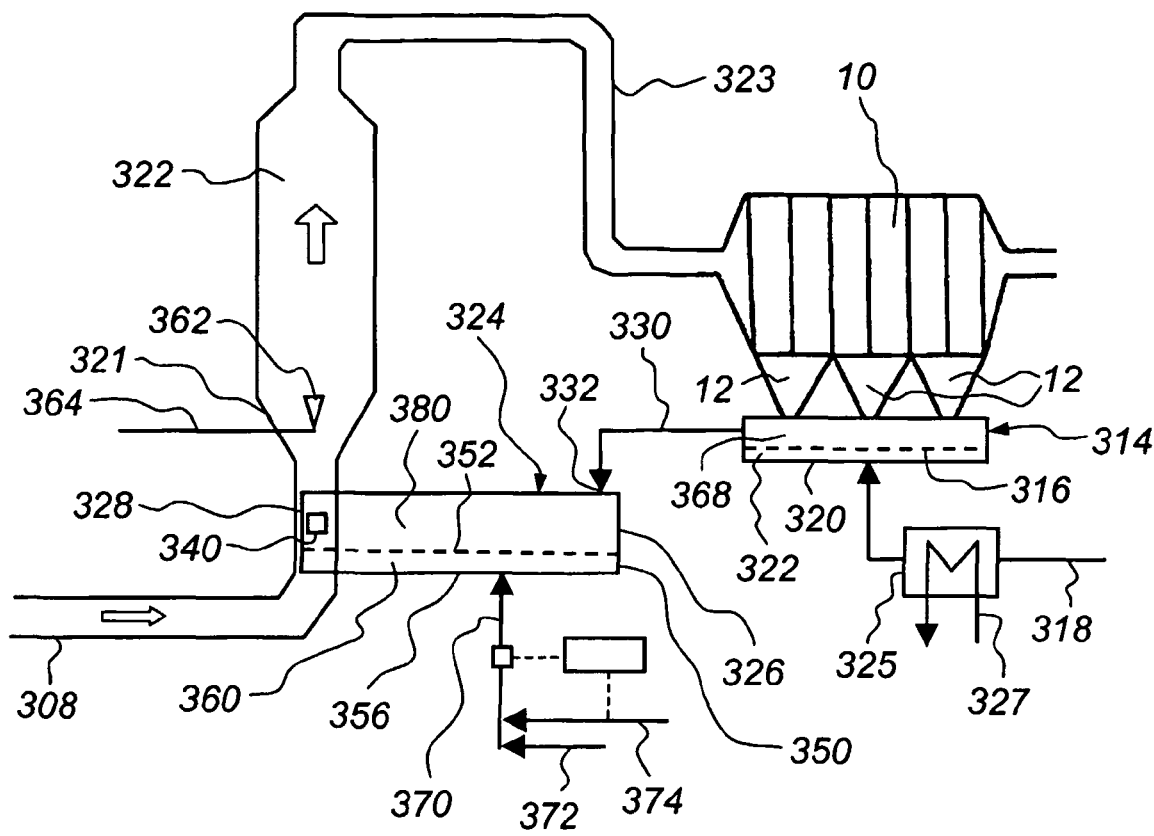
FIG. 5 is a schematic cross-sectional view of a fourth embodiment of the invention.

FIG. 5 shows a fourth embodiment of the invention. In this embodiment, a collecting vessel 314 is used as a cooling zone 368, and a mixer 324 is used in its entirety as a moistening zone 380. The dust hoppers 12 in the precipitator 10 open into the fluidised collecting vessel 314 which has a gas-permeable cloth 316. A compressed air line 318 is arranged to supply compressed air to an air chamber 322 formed between the cloth 316 and the bottom 320 of the vessel 314, for the purpose of fluidising the dust that has been collected in the dust hoppers 12. The compressed air line 318 is provided with a heat exchanger 325. Water having a temperature which is lower than the temperature of the dust separated in the precipitator 10 is supplied to the heat exchanger 325 through a pipe 327. The heat exchanger 325 has such a heat transfer surface that compressed air supplied through the line 318 can be cooled to a temperature which is lower than the temperature of the dust separated in the precipitator 10. The cooled compressed air supplied through the line 318 to the vessel 314 will cool the dust during fluidisation. The dust cooled in the vessel 314 is then fed through a dust line 330 and an inlet 332 located at the first end 326 of the mixer 324, into the mixer 324.

A gas-permeable cloth 352 is fixed in the lower portion 350 of the mixer 324. The space between the cloth 352 and the bottom 356 of the mixer 324 forms a chamber 360. A gas conduit 370 is arranged to supply pressurised gas to the chamber 360. The gas conduit 370 is supplied with compressed air through an air line 372 and water vapour through a vapour line 374. The saturation temperature of the gas is controlled in the way described above with reference to FIG. 2 so that the saturation temperature is kept higher than the temperature of the cooled dust. Since the saturation temperature of the gas supplied through the gas conduit 370 is higher than the temperature of the cooled dust, water vapour will condense on the particles contained in the dust in the moistening zone 380. The thus moistened particles leave the mixer 324 through an outlet 340 for moistened dust which is located at the second end 328 of the mixer and formed as an overflow. The dust is mixed with a flue gas generated in a boiler (not shown in FIG. 5). The boiler is provided with a device for boiler injection of limestone, $CaCO_3$. Thus the flue gases generated in the boiler and supplied through a duct 308, which via the outlet 340 communicates with the mixer 324, will also contain some burnt lime, CaO, which has been produced in the boiler as a result of the boiler injection. In the embodiment shown in FIG. 5, the burnt lime produced in the boiler will thus constitute an addition of fresh absorbent. When the flue gas in the duct 308 passes by the outlet 340, it will entrain the moistened dust which via the outlet 340 leaves the mixer 324. Then the flue gas mixed with moistened dust reaches a contact reactor in the form of a fluidised bed 322. Moistened dust, flue gas and water, which by means of a water pipe 364 and a nozzle 362 is injected into the lower portion 321 of the bed 322, are mixed in the fluidised bed 322. The nozzle 362 is designed so that the water is atomised and mixed with the flue gases and the moistened dust. Thus, the burnt lime, which by the treatment in the moistening zone 380 has been activated by particles being broken, can be slaked by the water injected into the bed 322 by means of the nozzle 362, and thus immediately react with gaseous pollutants. The flue gas and the particles are then passed through a duct 323 from the fluidised bed 322 to the precipitator 10 where the particles are separated and again passed to the collecting vessel 314 for renewed cooling in the cooling zone 368 and subsequent moistening in the moistening zone 380. A small part of the dust collected in the precipitator 10 is continuously removed in order to compensate for fresh absorbent material being supplied continuously. For instance, dust can be removed from the hoppers 12, in which case the removed amount need not be cooled in the vessel 314, from the actual vessel 314 or from the line 330 through a discharge line not shown in FIG. 5.

It will be appreciated that many modifications of the embodiments described above are conceivable within the scope of the invention as defined by the appended claims.

For instance, it is possible to use merely cooled air in the direct cooling of the dust also in other embodiments than the embodiment illustrated in FIG. 5. In such a case, it is possible in the embodiment shown in FIG. 4 to exclude the first chamber and the nozzles and make the mixer shorter. Thus, the cooling zone is located entirely in the collecting vessel, only the moistening zone being located in the actual mixer. It is also possible to supply some water to the collecting vessel in order to further increase the direct cooling. In some cases, the temperature of the supplied compressed air is sufficiently low even at the beginning, i.e. lower than the temperature of the dust that has been collected in the precipitator, thereby making cooling by means of a heat exchanger unnecessary. In such cases, the heat exchanger 225 and 325, respectively, can thus be excluded in the embodiments shown in FIG. 4 and FIG. 5 respectively.

The above-described electrostatic precipitator can alternatively consist of some other suitable dust precipitator, such as a fabric filter, for instance a bag filter, or a cyclone or some other filter that is suitable for separation and recirculation of particulate material.

The addition of water to the actual contact reactor, as shown in FIG. 5, can also be made in the embodiments shown in FIGS. 2-4. Thus, for instance a nozzle can be placed in the contact reactor 22 in the embodiment shown in FIG. 2 to inject and mix water with the moistened dust and the flue gases. This is advantageous since burnt lime, which has been activated in the moistening zone 80, can be slaked directly in the flue gas by means of the water injected into the contact reactor. This means that the burnt lime which has been activated in the moistening zone can even in the first mixing with the flue gas react with gaseous pollutants.

The stirrer of the mixer can be designed in various ways. A preferred design is a longitudinal paddle shaft according to FIG. 2, or a plurality of longitudinal paddle shafts. Another preferred design involves the parallel paddle shafts as described in U.S. Pat. No. 6,213,629. It is also possible to do without mechanical stirrers in the mixer and instead let the fluidising compressed air or the fluidising gas containing water vapour effect the stirring in the mixer. The important thing is that satisfactory mixing of water or gas with the dust should be provided and that the dust in the moistening zone should not be remixed with the dust in the cooling zone to any great extent.

EXAMPLE 1

An experiment was carried out by means of a mixer 24 of the type shown in FIG. 2. A synthetic flue gas having a sulphur dioxide, $SO_2$, content of 1000 ppm was used. The flue gas was fed through a contact reactor 22 past the outlet 40 of the mixer 24, after which the dust was separated in a dust separator in the form of a fabric filter. The cleaned synthetic flue gas had a temperature of about 74° C. The separated dust was then recirculated to the mixer 24. The temperature of the dust, before being supplied to the mixer 24, was about 72° C., i.e. somewhat lower than the temperature of the cleaned flue gas. On average, the dust was circulated 35 times through the mixer, the contact reactor and the filter before being removed for disposal.

As fresh absorbent, a fly ash was used, collected from a coal-fired power plant, which had boiler injection of limestone, which means that limestone, $CaCO_3$, was supplied directly to the boiler. The fly ash had a content of available burnt lime, CaO, of 30% by weight (measured according to ASTM C25). The supply of fresh absorbent in the form of fly ash was set at a stoichiometry of 1.6, i.e. for each mole of $SO_2$ in the uncleaned flue gas, 1.6 mole of CaO in the form of fly ash was supplied to the mixer.

Water was supplied to the cooling zone 68 of the mixer. The water had a temperature of about 10° C. The quantity of water in kg/s was about one twentieth of the amount of recirculated dust in kg/s. When passing through the cooling zone, the average temperature of the dust was lowered by about 2-3° C., but locally on the surface of the particles, the temperature may be assumed to have been reduced to a significantly greater extent. The average residence time of the dust in the cooling zone was about 10 s.

The cooled dust then left the cooling zone and was almost instantaneously, within 1 s, subjected to the moistening zone 80. The gas which was supplied to the moistening zone through the gas conduit 70 was a mixture of compressed air and water vapour and had a temperature of 86° C. and was saturated at this temperature (the moisture content of the gas was about 60%). Thus, a great amount of water vapour was condensed on the particles of the dust in the moistening zone of the mixer. The average residence time of the dust in the moistening zone was about 15 s. The dust was then supplied as moistened absorbent material almost instantaneously, within 1 s, to the contact reactor 22 through the outlet 40. Measurements proved that about 84% of the $SO_2$ that was present in the uncleaned flue gas was converted into separable dust, and only 16% of the total amount of $SO_2$ was to be found in the cleaned flue gas.

EXAMPLE 2

In Example 2, a mixer 24 of the same type as in Example 1 was used. Also the other experimental parameters were the same as in Example 1, except that the cleaned flue had a lower temperature, more specifically a temperature of 65° C. Moreover, the flue gas in Example 2 had a temperature which was only 11° C. higher than the current saturation temperature of the flue gas, compared with 14° C. higher in Example 1. These two differences, which were due to differences in the generation of the synthetic flue gas, would, under otherwise identical conditions, be expected to improve the separation of $SO_2$ in Example 2 compared with Example 1.

Only compressed air was supplied to the "moistening zone" of the mixer, no water vapour. The gas which thus contained only compressed air and which was supplied to the moistening zone through the gas conduit 70 had a saturation temperature of about 12° C., which corresponds to a moisture content of about 1.5%, and a temperature of 86° C. The dust had a temperature of about 63° C. when being fed to the cooling zone of the mixer. In this Example, hardly any condensation of water vapour at all thus occurred in the "moistening zone" of the mixer. Measurements proved that only about 61% of the $SO_2$ that was present in the uncleaned flue gas was converted into separable dust, and as much as 39% of the total amount of $SO_2$ was to be found in the cleaned flue gas.

EXAMPLE 3

Under essentially the same conditions as in Example 2, an attempt was made to increase the stoichiometry, i.e. the amount of added burnt lime, CaO, in relation to the amount of $SO_2$, for the purpose of increasing the amount of converted and separated $SO_2$. Therefore the stoichiometry was increased from 1.6 to 3.9. However, measurements proved that in spite of this greatly increased stoichiometry, only slightly more than 60% of the $SO_2$ that was present in the uncleaned gas was converted into separable dust.

As is evident from the Examples above, the invention, as exemplified in Example 1, has great advantages as regards the capacity of separating gaseous pollutants, in particular $SO_2$, compared with the cases where the gas supplied to the "moistening zone" does not have a saturation temperature which is higher than the temperature of the dust, which is exemplified in Examples 2 and 3.

The invention claimed is:

1. A method of separating gaseous pollutants, such as sulphur dioxide, from hot process gases, such as flue gases, in which method the process gases are passed through a contact reactor (22; 322), in which a particulate absorbent material reactive with the gaseous pollutants is introduced in a moistened state into the process gases in order to convert the gaseous pollutants into separable dust, after which the process gases are passed through a dust separator (10), in which dust is separated from the process gases and from which the cleaned process gases are discharged, characterised in that a circulating part of the dust separated in the dust separator (10) is cooled in a first step by being brought into direct contact with a cooling fluid, the cooled dust is mixed in a second step with a gas containing water vapour, said gas having a saturation temperature that is higher than the temperature of the cooled dust, and the dust moistened by condensation of the water vapour is introduced as absorbent material into the contact reactor (22; 322) to be mixed with the process gases.

2. A method as claimed in claim 1, in which the cooled dust contains burnt lime, CaO, which during at least one of said first and second step at least partly is subject to slaking to slaked lime, $Ca(OH)_2$.

3. A method as claimed in claim 1 or 2, in which fresh absorbent material is continuously supplied to the process gases, part of the dust separated in the dust separator (10) being removed without being brought into direct contact with the cooling fluid.

4. A method as claimed in claim 1, in which the dust is cooled in said first step by being mixed with water, which has a lower temperature than the dust separated in the dust separator (10).

5. A method as claimed in claim 4, in which said circulating part of the dust separated in the dust separator is introduced into a mixer (24; 124; 224), which has an inlet (32; 132; 232) at a first end (26; 126; 226) and an outlet (40) at a second end (28; 128), said circulating part of the dust separated in the dust separator (10) being passed horizontally through the mixer (24; 124; 224) from the first end (26; 126 226) to the second end (28; 128) and being mixed with water and cooled in a cooling zone (68; 168; 268) adjacent to the first end (26; 126; 226) of the mixer (24; 124; 224), so as then to be mixed, in a moistening zone (80; 180; 280) adjacent to the second end (28; 128) of the mixer (24; 124; 224), with the gas containing water vapour.

6. A method as claimed in claim 1, in which the dust is cooled in said first step by mixing with air which has a lower temperature than the dust separated in the dust separator (10).

7. A method as claimed in claim 6, in which the air is at least partly supplied to a collecting vessel (214) connected to the dust separator (10) and intended for collecting separated dust.

8. A method as claimed in claim 1, in which water is supplied directly to the contact reactor (322) and is mixed with the moistened dust and the process gases.

9. A method as claimed in claim 1, in which the first step is carried out during a period of 2-600 s on average, and that the cooled dust is then subjected to the second step within 10 s.

10. A method as claimed in claim 1, in which the second step is carried out during a period of 2-30 s on average, and that the moistened dust is then introduced into the process gases within 5 s.

11. A method as claimed in claim 1, in which said gas contains air and water vapour which are mixed to the desired saturation temperature.

12. A method as claimed in claim 1, in which the gas, which contains water vapour, has a saturation temperature which is 5-30° C. higher than the temperature of the cooled dust.

13. A mixer for moistening a particulate dust, which can react with gaseous pollutants in a process gas, such as a flue gas, in order to form a separable dust, characterised in that the mixer (24; 124; 224) has a first end (26; 126; 226) and a second end (28; 128) and is divided into two zones, of which a first zone is a cooling zone (68; 168; 268) which is located at the first end (26; 126; 226) and which is provided with a means (62, 64; 162, 164, 166, 167; 262, 264) for supplying a cooling fluid, and of which a second zone is a moistening zone (80; 180; 280) which is located at the second end (28; 128) and which is provided with a means (70; 170; 270) for supplying a gas containing water vapour, the mixer (24; 124; 224) being adapted first to pass dust from an inlet (32; 132; 232) for dust, located at the first end (26; 126; 226), through the cooling zone (68; 168; 268) and, in the cooling zone, supply a cooling fluid having a lower temperature than the dust, and mix the dust with this fluid, then pass the dust through the moistening zone (80; 180; 280) and, in the moistening zone, supply a gas containing water vapour and having a saturation temperature which is higher than the temperature of the cooled dust, and mix this gas with the cooled dust, and then introduce the moistened dust as absorbent material into the process gas through an outlet (40) located at the second end (28; 128).

14. A mixer as claimed in claim 13, in which the means (62, 64; 162, 164; 262, 264) for supplying a cooling fluid is arranged to supply water to the dust.

15. A mixer as claimed in claim 13 or 14, in which the mixer has a means (166) for supplying cooled compressed air to the cooling zone (168).

16. A device for separating gaseous pollutants, such as sulphur dioxide, from hot process gases, such as flue gases, said device having a contact reactor (22; 322), through which the process gases are intended to be passed and which has means (24, 40; 124; 224; 324; 340) for introducing a particulate absorbent material in a moistened state, which is reactive with the gaseous pollutants, into the process gases for the purpose of converting the gaseous pollutants into separable dust, and a dust separator (10) which is adapted to separate the dust from the process gases and discharge the cleaned process gases, characterised in that the device has a cooling zone (68; 168; 268; 368) for cooling at least a circulating part of the dust separated in the dust separator (10), means (62, 64; 162, 164, 166; 218, 262, 264; 318) for supplying a cooling fluid to the cooling zone (68; 168; 268; 368) for cooling the dust by direct contact between the fluid and the dust, means (52; 152; 330) for feeding the cooling dust to a moistening zone (80; 180; 280; 380), means (70; 170; 270; 370) for supplying a gas containing water vapour and having a saturation temperature which is higher than the temperature of the cooled dust, to the cooled dust in order to moisten this by condensation of water vapour, and means (40; 340) for feeding the moistened dust to the contact reactor (22; 322).

17. A device as claimed in claim 16, in which a means (362, 364) is arranged to inject water into the contact reactor (322) and mix this with the moistened dust and the process gases.

* * * * *